July 3, 1934.    L. EMANUELI    1,964,907
ELECTRIC CABLE
Filed March 15, 1927    2 Sheets-Sheet 1
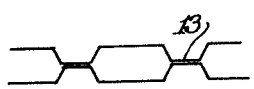
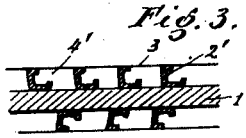
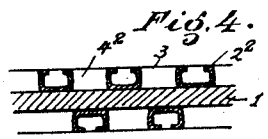
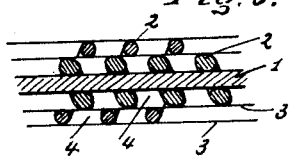
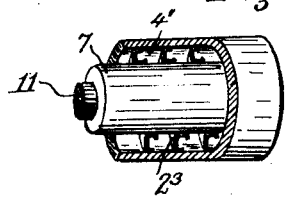
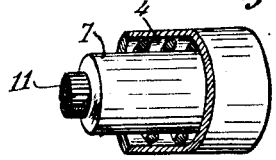
Inventor:
Luigi Emanueli
By
Attorney July 3, 1934.  L. EMANUELI  1,964,907
ELECTRIC CABLE
Filed March 15, 1927   2 Sheets-Sheet 2
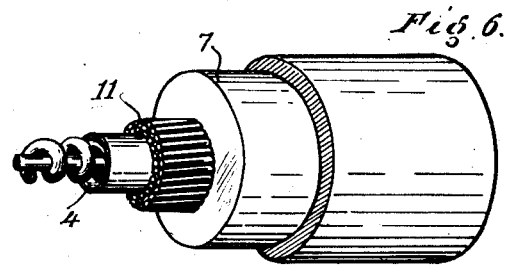
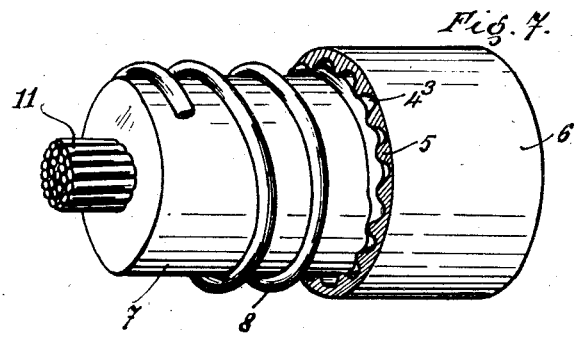
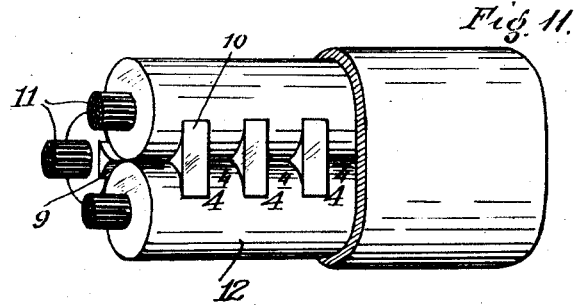
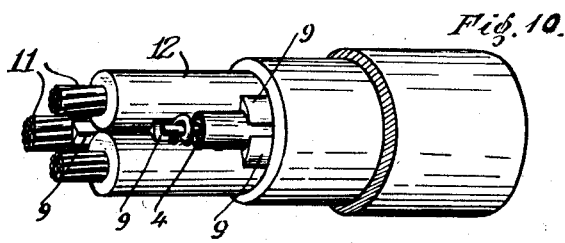
Inventor:
Luigi Emanueli
By
Attorney.

Patented July 3, 1934

1,964,907

UNITED STATES PATENT OFFICE 1,964,907

ELECTRIC CABLE

Luigi Emanueli, Milan, Italy, assignor to Società Italiana Pirelli, Milan, Italy Application March 15, 1927, Serial No. 175,593
In Great Britain March 17, 1926

12 Claims. (Cl. 173—266)

This invention relates to electric cables and in particular to those of the type intended for the transmission of electrical power at very high voltages.

Electric cables for power transmission are generally formed in the following manner: The stranded conductors are insulated with a number of layers of paper, the different cores are then stranded together and the empty spaces between them filled up with special fillers made of paper, jute or some other textile material. The cores stranded together with the fillers are then insulated by means of a belt composed of a number of paper layers, and after impregnating the cable with the insulating compound it is then sheathed with lead and finally armoured with steel tape or steel wires. In this type of cable, for every diminution of temperature that occurs there is a corresponding contraction of the impregnating compound and, as a result of this, spaces filled only with gas or vapours are formed all through the dielectric. In these spaces the dielectric strength is very limited and glow discharges can take place therein to the detriment of the life of the cable. To avoid trouble of this nature feeding tanks filled with the impregnating compounds and connected to the cable have been proposed, the compound being delivered to the different points of the cable by means of channels formed in the cable during its construction and connected to the tanks. These tanks, which are situated all along the length of the cable, furnish it with the necessary amount of liquid impregnating compound to compensate for the contraction due to the lowering of the temperature of the cable itself, whilst when the temperature of the cable rises, liquid impregnating compound is forced out of the channels in the cable and returns to the feeding tanks. In contradistinction to an electric cable system of the kind referred to comprising electric cables provided with longitudinal tubular cavities or channels filled with a liquid impregnating compound, such as a light oil, and tanks or feeders containing the said compound located at predetermined distances along the cable and communicating with the cavities in the cable which are thus always kept full of compound, it is now proposed to dispense with the feeding tanks and to use these channels themselves in the cable as reservoirs, employing in place of light oils a thicker material, as the impregnating compound, thereby taking advantage of the fact that such impregnating compound can be absorbed by capillarity from said channels into the fibrous dielectric, whilst it will not easily flow along the cable as would a light oil, but only pass radially from the dielectric to the channels during the heating of the cable and return to the dielectric during the cooling of the cable, thus leaving the channels in this latter case, temporarily at least, partly empty through withdrawal therefrom by the fibrous dielectric, owing to capillary action, of the compound that is required for a perfect impregnation. In this case, owing to the fact that the channels may become filled only with gas for the reasons just mentioned, care must be taken to locate them in positions where the dielectric stress is limited. It is also possible to diminish the dielectric stress by using conductive walls for the channels, but of course these walls must be permeable to the compound. A good impregnation of cables constructed on these principles can however only be ensured in the case in which the cable is laid level. In practice, however, many cases arise in which the cable is not laid level, and the compound can then flow from the higher point, leaving the higher parts of the cable free from impregnating compound.

The present invention has for its object to provide a construction of cable which, whilst based upon the principle previously mentioned of dispensing with the use of feeding tanks exterior to the cable and utilizing channels in the cable as reservoirs, will obviate the disadvantage above referred to.

For this purpose, according to the present invention, in an electric cable having one or more cores, there are provided in the interior of the conductors, or between the insulation around the conductors and the lead sheath, or in the spaces between the several cores of the cable, feeding cavities or channels with walls electrically conductive over the whole or part of their surface and permeable to the impregnating compound. These cavities or channels serve as reservoirs, in place of feeding tanks separate from the cable, for the supply or reception of impregnating compound to or from the impregnated insulating material of the cable, and they are constructed in such manner as to prevent a free and unimpeded longitudinal flow therethrough of impregnating compound from the highest situated parts to the lowest situated parts of the cable, the dimensions of said cavities or channels being such that they can supply to the impregnated insulating material in the cable an amount of the impregnating compound at least sufficient to compensate for the maximum diminution in volume, occasioned by its thermal contraction, of the compound with which the said insulating material in the cable is impregnated.

By making the walls of the feeding cavities electrically conductive over the whole or part of their surface there are avoided dielectric stresses such as might be occasioned by the emptying of the cavities due to the absorption therefrom of the insulating compound.

The feeding cavities may be constructed according to two types, those of the first, which will be referred to as the "section type", comprising longitudinally arranged channels running axially or to one side of the axis of the cable, divided into a series of small sections or compartments, and those of the second, which will be referred to as the "spiral" type, comprising helical channels formed round a core of suitable material. In the construction of the section type of channels either separating partitions of special material such as cork, wood, paper or jute may be used to divide the longitudinal channels into the requisite number of small sections, or the walls of the channels may be so constricted as to form a small bore at frequent intervals. A suitable method of forming the spiral type channels is to spirally wind a length of impermeable substance about a central core and enclose the whole in a tube made of material permeable to the impregnating compound, so as to form a spiral channel bounded by the walls of the tube. Lack of effectiveness of this arrangement can only arise in very exceptional cases which can be avoided. For instance instead of carrying the cable vertically to the terminal ends it can be laid at an angle to the vertical which is smaller than the angle of the lay of the spiral of the feeding cavities.

In order that the said invention may be clearly understood and readily carried into effect, the same will now be described more fully with reference to the accompanying drawings in which:—

Figure 1 represents a feeding cavity of the section type comprising a longitudinal channel the walls of which are constricted at intervals.

Figures 2, 3, 4 and 5 illustrate feeding cavities constructed according to the spiral type.

Figure 6 illustrates a single-core cable with a feeding cavity located in the interior of the conductor itself.

Figures 7, 8 and 9 illustrate single-core cables with feeding cavities located between the lead sheath and the insulation.

Figures 10 and 11 illustrate three-core cables with feeding cavities located between the lead sheath and the conductor insulation, and Figure 12 is a detail view showing a section of a conductor made up of wires of a special shape.

In the feeding cavity of the section type illustrated in Figure 1, the walls 3 are constricted to a small bore at frequent intervals.

In the spiral type cavity a wire or tape 2 of any suitable shape, for example of circular or L or channel-shape in cross section as shown in Figures 2, 3 and 4 respectively, and made of metal or other suitable impermeable substance, is spirally wound with a relatively low pitch over a central core 1 of metal or other suitable material preferably covered with a layer of paper, and the spirally wound wire or tape is enclosed by a tubular wall or tube 3 made of material such as paper, textile fabric, or a discontinuous metallic layer which is permeable to the impregnating compound, the feeding cavity being constituted by the spaces between the turns of the spirally wound wire or tape 2.

Instead of one spiral feeding cavity, formed by winding a single wire or tape in the manner described above, two or more wires or tapes 2 may be wound spirally one over the other as shown in Fig. 5, the respective spirals being separated by tubular walls of permeable material 3, thus forming a number of feeding cavities.

If the central core 1 around which the spiral is wound is made of metallic material, it can also be used as an auxiliary conductor in connection with protective devices for testing the cable or for other purposes.

The feeding cavities or channels constructed as described above can be located inside the conductors of the cable or between the insulation and the lead sheath, whilst in the case of multicore cables they can be situated in the spaces between the cores normally occupied by the fillers, these spaces being wholly or partially used for this purpose. When the feeding cavities are located in the spaces between the cores and do not wholly fill the said spaces, the parts which remain empty should be filled in the ordinary way with paper, jute or other suitable material as indicated at 9 in Fig. 10, in order to avoid the formation of gas bubbles which may damage the cable. In the case where the feeding cavities are situated in the copper conductor no dielectric stress comes into play, but when the space between the insulation and the lead sheath, or the spaces between the cores are used, the question of dielectric stresses may assume considerable importance. In order, therefore, to avoid dielectric stresses in the interiors of the feeding cavities where empty spaces may be formed, the walls of the cavities are made electrically conductive, or at least partially so, as previously mentioned. The conductive walls of the feeding cavities or channels or of the tubes enclosing them may be constituted by the discontinuous metallic layer previously mentioned and comprising for example a metallic net, or a metallic tape having holes or gaps therein, or a permeable material such as paper with a metalized surface, or wires or tapes wound helically. Where the total space between any two cores is used as a feeding cavity the surfaces of the cores are covered with an electrically conductive layer 12 permeable to the compound.

In the case of the single-core cable illustrated in Figure 6, the feeding cavity is located inside the conductor 11; the feeding cavity illustrated is of the spiral type, but if desired a cavity of the section type could be similarly located.

In the case of the single core cable illustrated in Figures 7, 8 and 9, the feeding cavities are disposed between the lead sheath of the cable and the insulation. In the arrangement shown in Figure 7, the feeding cavities, which are of the section type, are built up by using a lead sheath 6 the inner surface of which is constructed with corrugations 5 so as to form channels between the surface of the insulation 7 and the lead, these channels being interrupted at short distances along the cable by means of a spiral winding 8 of jute, cotton or other suitable material wound over the insulation 7 so that the winding is pressed against and stops up the channels at frequent intervals. In the arrangements shown in Figures 8 and 9, the feeding cavities are of the spiral type produced by spirally winding a wire (see Figure 9) or a tape of L-shape in cross-section (see Figure 8) over the insulation 7.

In the three-core cables illustrated in Figures 10 and 11, the feeding cavities are located between the cores which are provided with electrically conductive surfaces, spiral type cavities being used in the construction shown in Figure 10 and the spaces between the cavities and the cores being filled with small fillers 9, whilst in the construction shown in Figure 11 the feeding cavities are of the section type, separators 10 made of any suitable material being placed at short intervals so as to divide the cavities into the requisite number of small sections.

The dimensions of the cavities in all cases must be such that their volume over a unit length of the cable is not less than the maximum thermal contraction of the impregnating compound contained in the unit length of the cable.

In cables constructed in the usual manner, there are small longitudinal channels, formed generally by the spaces existing between the wires of the copper strand of which the conductors are made, which allow the impregnating compound to flow to the lowest parts of the cable along its route. It is of importance to avoid the drainage due to such channels or at least to reduce it to the minimum amount possible, and in order to stop up these channels or to reduce the drainage effect to a large extent several methods can be employed. Instead, therefore, of using round copper wires for the conductors, they may be made of tapes of special shape, as with flattened sides as shown in Figure 12 so as to fit closely to one another and thus reduce the space between them, or the same result may be obtained by hammering a strand made in the usual way. Another method is to strand the copper wires together with jute cords or some similar material which, being held between the copper wires, fills the spaces between them. Thirdly, in making up the strand a soft layer of paper or other suitable material may be wound over each layer—this is pressed between the layers and fills the spaces between the wires. Lastly, the strand may be filled at short intervals with tin or other suitable material. Any of the above mentioned methods may be used to avoid drainage of the impregnating compound in cables provided with feeding cavities or channels constructed in accordance with the present invention.

In the feeding cavity of section-type, illustrated in Figure 1, the walls are constricted to a small bore at frequent intervals, as indicated at 13.

In the spiral-type cavity, shown in Figures 2, 3 and 4, a wire or tape is wound spirally around a central core 1 of metal or other suitable material (which may be covered with a layer of paper); and this wire or tape may itself be made of metal or other impermeable substance and may be circular or channel-shaped in section. Thus, in Figures 2, 5 and 9, a wire 2 of circular, or substantially circular, section is shown, while in Figures 3, 4 and 8, tapes 2', 2² and 2³ of slightly different channel sections are represented.

The spirally-wound wire or tape is enclosed within a tubular wall or tube 3 made of material such as paper, textile fabric, or a discontinuous metallic layer which is permeable to the impregnating compound; and the previously-mentioned feeding conduit is constituted by the spaces between the turns of the wire or tape, the different forms of which produce channels of different cross-sectional shapes, as indicated at 4 (Figures 2, 5, 6, 9 and 10); 4' (Figures 3 and 8); 4² (Figure 4); 4³ (Figure 7); and 4⁴ (Figure 11).

I claim as my invention:

1. An electric cable comprising a sheath, a plurality of cores within the sheath arranged side by side, each core embodying a conductor covered with impregnated insulating material, a feeding channel containing liquid compound located between the cores and having a wall that is electrically conductive for a part of its surface and also permeable to said liquid, and a core and spiral means within the channel preventing a free flow of the compound therethrough from the highest to the lowest situated parts of the cable, said channel having such dimensions as to supply to the insulating material an amount of compound sufficient to compensate for the maximum decrease in volume occasioned by the thermal contraction of the compound with which said material is impregnated.

2. An electric cable comprising a conductor, an insulating covering therefor, a fluid-tight sheath enclosing the covering, a feeding channel within the sheath having an electrically conductive wall permeable to liquid, a body of liquid compound in the channel, and a core located within the channel comprising a means forming longitudinally spaced feeding cavities within the channel and also preventing free longitudinal movement of the compound.

3. An electric cable comprising separately insulated conductors forming cores, a permeable electrically conductive covering for each of the cores, an enclosing sheath for the cores, the cores defining longitudinal channels, a body of insulating compound in each of the channels, and means located in each of the channels comprising a central member and a wrapping around the member for dividing the interior of the channel into spaced feeding cavities.

4. An electric cable comprising separately insulated conductors forming cores, a permeable electrically conductive covering for each of the cores, an enclosing sheath, the cores defining longitudinal channels, bodies of liquid insulating compound in the channels, a hollow member permeable to the compound in each of the channels, a central member within the hollow member, means spirally wound around each of the central members for dividing the interior thereof into spaced feeding cavities, and fillers of insulation located in the spaces between said members and sheath not occupied by the hollow members.

5. An electric cable comprising separately insulated conductors forming cores, a permeable electrically conductive covering for each of the cores, an enclosing sheath for the cores, the cores defining longitudinal channels, bodies of liquid insulating compound in the channels, a hollow member permeable to the compound in each of the channels, an element within each of the hollow members, and a metallic strip wrapped around the element within the hollow member in the form of a small pitch spiral to form spaced cavities for the compound and prevent free longitudinal movement thereof.

6. An electric cable comprising a conductor, fibrous insulating material surrounding the same, and an impervious sheath enclosing said conductor and insulation, said cable having a channel extending longitudinally thereof to contain a fluent impregnating compound capable of being absorbed by said fibrous insulation, at least a portion of the walls of said channel throughout its length being permeable to said compound whereby the latter may flow to and from said insulating material transversely of the cable, and said channel having means for preventing the free and unrestricted flow of said compound therethrough from the high to the low situated parts of the cable, said means dividing the channel into longitudinally spaced cavities.

7. A liquid filled electric cable comprising a conductor, a layer of liquid impregnated insulating material surrounding the same, and an impervious sheath enclosing said conductor and insulating material, said cable having a liquid containing channel extending longitudinally thereof, the walls of said channel being permeable to said liquid, and said channel having means disposed transversely thereof for obstructing the free flow of liquid along said cable from a high to a low part thereof.

8. An electric cable according to claim 6, in which the means for preventing free flow of the impregnating compound comprises forming the channel between said cavities with greatly restricted portions.

9. A liquid filled electric cable comprising an impervious sheath, and a stranded conductor therein having a layer of fibrous insulating material surrounding the same, said cable having a channel extending longitudinally thereof to contain a fluent impregnating compound capable of being absorbed by said fibrous insulating material, at least a portion of the walls of said channel being permeable to said compound, means for obstructing the free flow of said compound through said channel, and means for substantially preventing the seepage of said compound lengthwise of the spaces between the strands of said conductor.

10. An oil filled electric cable comprising an impervious cylindrical sheath, a core disposed centrally therein and spaced therefrom to provide a channel of annular cross-section for containing the oil, said core including a conductor and a layer of fibrous insulating material enveloping the same, and a spiral strip wound around said core in the annular space between the core and said sheath, said strip serving to prevent the free flow of oil through said channel.

11. An oil filled electric cable comprising a tubular cylindrical conduit, a conductor and a central core co-extensive therewith, said core being formed at least in part of insulating material and being of smaller diameter than said conduit, whereby an oil channel of annular cross-section is provided, and means for preventing the free flow of oil, through said channel comprising a spiral strip of relatively low pitch wound around said core and engaging the inner surface of said conduit.

12. An electric cable comprising a plurality of separate cores, each made up of a central conductor and an envelope of impregnated absorbent insulating material, and an impervious sheath enclosing said cores, the cable thus formed having a longitudinally extending channel defined by two cores and said sheath, a tubular conduit in said channel for containing an impregnating compound and having walls permeable to said compound, a core within said conduit, and a spiral strip wound around said core and substantially filling the space between said core and inner surface of said conduit.

LUIGI EMANUELI.